July 7, 1970  G. R. STUTZMAN  3,519,409
METHOD OF FORMING GLASS-TO-GLASS SEALS USING INDUCTION HEAT
Filed March 15, 1967
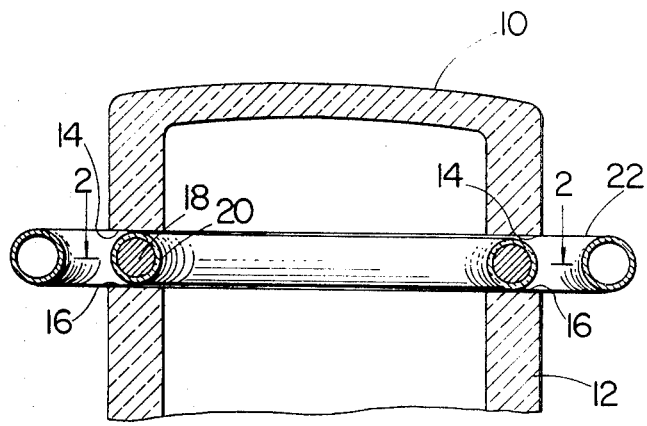
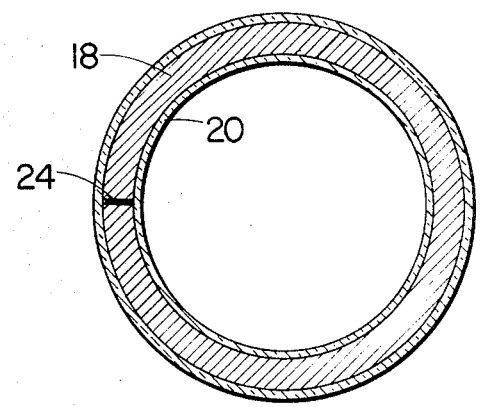
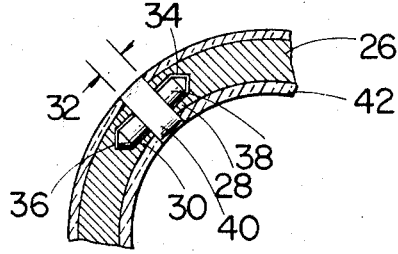
INVENTOR
GUY R. STUTZMAN
BY Hood, Gust & Irish
ATTORNEYS

United States Patent Office 3,519,409
Patented July 7, 1970

3,519,409
METHOD OF FORMING GLASS-TO-GLASS SEALS USING INDUCTION HEAT
Guy R. Stutzman, Fort Wayne, Ind., assignor to International Telephone and Telegraph Corporation, Nutley, N.J., a corporation of Delaware
Filed Mar. 15, 1967, Ser. No. 623,457
Int. Cl. C03b 23/20
U.S. Cl. 65—40      5 Claims

ABSTRACT OF THE DISCLOSURE

Method of forming a sealed joint between two glass members whereby a metal member is precoated with glass so as to be completely surrounded by the glass. The coated metal member is sandwiched between the two glass members and then is inductively heated until its glass coating melts to form a glass-to-glass seal between the two glass members with the metal member completely enclosed in the seal.

BACKGROUND OF THE INVENTION

Field of the invention

The present invention relates generally to glass-to-glass seals, and more particularly to an improved method for providing a glass-to-glass seal.

Description of the prior art

Presently known methods of providing glass-to-glass seals involve the use of a flame to melt the joint between the two glass articles being sealed. Such techniques have been found to have several disadvantages. One of these disadvantages is that the melting zone is difficult to control and will, sometimes, extend too far on each side of the joint so as to cause sag and distortion, especially in joints between larger glass articles, such as large vacuum tubes. Another disadvantage of the flame-technique is that flame gases cause contamination of the parts being joined. For instance, in sealing an electron vacuum tube, flame gases can cause contamination of the interior of the tube and the parts disposed therein. Still another disadvantage of the flame-technique is that complicated mechanisms are required for directing the flame about odd shapes and contours of glass articles being joined and sealed.

SUMMARY OF THE INVENTION

The method of the present invention does not involve the use of a flame to melt glass, but, instead, involves the use of induction heat to melt the glass. Thus, the only source of contamination is that which is given off by the melting glass. In the practice of the method of the present invention, a glass coated metal object is placed between the two pieces of glass being joined and the metal object is inductively heated until its glass coating is melted, thereby causing the glass-to-glass joint to close and seal. The metal object becomes an integral part of the seal, and, therefore, the metal object is preferably fabricated from a metal having a coefficient of expansion which is substantially equal to the coefficient of expansion of the glass articles being joined. Of course, the metal object is required to develop the melting temperature in an inductive field. The glass coating on the metal object provides the medium which, when melted, causes the glass-to-glass joint to close and seal.

The glass coated metal object can take many forms and, therefore, glass-to-glass seals having a wide variety of shapes and contours can be formed.

It is an object of the present invention, therefore, to provide an improved means for forming a glass-to-glass seal without incurring any of the above-mentioned problems commonly associated with presently known techniques for providing such seals.

Another object of the present invention is to provide a method for forming glass-to-glass seals wherein the only source of heat is generated inductively.

A further object of the present invention is to provide such a method wherein a glass coated metal object is sandwiched between the two glass objects being joined and the metal object is inductively heated to provide the necessary temperature for joining and sealing the glass objects.

Further objects and advantages of the present invention will become apparent by reference to the following description and the accompanying drawings, and the features of novelty which characterize the invention will be pointed out with particularity in the claims annexed to and forming a part of this specification.

BRIEF DESCRIPTION OF THE DRAWINGS

FIG. 1 is a fragmentary, sectional view showing the use of a glass coated metal ring to join and seal a glass face plate to an envelope portion of a vacuum tube and also showing, somewhat diagrammatically, an induction heating coil disposed about the glass coated metal ring;

FIG. 2 is a cross-sectional view showing the glass coated metal ring of FIG. 1 taken generally along the line 2—2; and FIG. 3 is a fragmentary, cross-sectional view showing another glass coated metal ring which may be used in the practice of the present invention.

DESCRIPTION OF PREFERRED EMBODIMENTS

The method of the present invention finds primary utility in the sealing of glass vacuum tubes, and it has been illustrated, and will be described in that endeavor. It will be clear, however, that such a method will find substantial utility in other applications, and that, as to such method, the following description is intended to be illustrative and not limitative.

In FIG. 1, a face plate 10 is shown properly aligned in position over a tubular envelope 12. The joining annular surfaces 14 and 16 of the face plate 10 and tubular envelope 12, respectively, are separated by a metal ring 18 which is coated with glass, as indicated by the reference number 20. A conventional annular, induction heating coil 22 is disposed about and generally aligned with the metal ring 18 so that, when the coil is energized, heat is generated in the metal ring 18 by the field established by the coil. Specifically, the metal ring 18 is heated until the glass coating 20 melts or softens sufficiently to form a seal between the surfaces 14 and 16. The glass coating 20 is considered to be melted when it has reached that state in which it will fuse to the surfaces 14 and 16 and thereby form a gas-tight seal between the surfaces. As used herein, therefore, the term "melting" does not necessarily mean obtaining a liquid state.

The heat from the melted glass coating 20 provides both radiant and conductive heat to the surfaces 14 and 16 and results in a localized heating area causing the surfaces to close and seal without distortion. The ring 18 thus becomes an integral part of the seal and, therefore, is preferably fabricated from a material having a coefficient of expansion substantially equal to the coefficient of expansion of the glass in the face plate 10, envelope 12 and glass coating 20. One such metal is an alloy, commonly called "Kovar," consisting of 29% nickel, 17% cobalt, .2% manganese and the balance iron. In a specific embodiment of the invention, the face plate 10 and envelope 12 were formed of Corning 7052 glass with the ring 18 being formed of Kovar and its coating 20 likewise 7052 glass. Corning 7052 glass is a borosilicate glass containing approximately 80% $SiO_2$, 14% $B_2O_3$, 4% $Na_2O$ and 2% $Al_2O_3$.

Since the metal ring 18 is not exposed to the atmosphere, the temperature can be raised to provide sufficient heat to melt the glass coating 20 without over-oxidizing the metal ring, which would otherwise cause bubbles in the seal if the ring was not precoated. Since the metal ring 18 is disposed directly between the surfaces 14 and 16 to be joined, it requires less heat to join and seal the surfaces than is required if the heat is applied externally. In electron vacuum tube production, the use of minimal heat is beneficial because the internal temperature of the tube is maintained at a level which will prevent damage to internal parts of the tube.

The metal ring 18 can be formed in any number of ways which are well known in the metal fabrication arts. For instance, as shown in FIG. 2, the metal ring 18 can be formed by binding a rod in a circle and butt welding its ends as by a heli-arc weld, or otherwise joining its ends, as indicated at 24. Thereafter, the glass coating 20 is applied to the ring 18. Methods for applying the glass coating 20 to the metal ring 18 are well known in the glass-to-metal seal art and, therefore, do not need to be discussed in this description.

In another embodiment, a metal ring 26, similar to the metal ring 18, can be formed as shown in FIG. 3. Specifically, a length of metal is formed in a circle with its ends 28 and 30 aligned but spaced apart by a distance or gap 32 approximately equal to that of a typical saw blade. A hole 34 is drilled in the end 28 and an identical hole 36 is drilled in the end 30 as shown in FIG. 3. A pin 38 fabricated from the same metal as the ring 26 is provided to fit into the holes 34 and 36 so as to join the ends 28 and 30. A glass ring 40 is disposed about the pin 38 so as to fill the space between the ends 28 and 30. The diameter of the glass ring 40 is substantially equal to the diameter of the glass coating 42, similar to the glass coating 20, which is formed on the metal ring 26.

The method of the present invention is ideally suited for sealing enclosures such as electron tubes, relays and hermetically sealed enclosures of all kinds in a vacuum chamber or in a chamber which has been backfilled with an inert atmosphere and, therefore, eliminates the standard tip off tubulation. Since the pressure outside the enclosure is equal to the pressure inside the enclosure when the enclosure is in a vacuum chamber or a pressure chamber, the inductive heating of the metal ring 18 does not cause a pressure differential which tends to blow or bloat the seal in or out. Thus, the method of the present invention makes it possible to seal off many enclosures, such as tubes, one at a time in a production line set-up in a vacuum chamber because the pump-down time for each enclosure is eliminated and all of the enclosures are evacuated at the same time.

What is claimed is:

1. A method for forming a sealed joint between two glass members comprising the steps of providing a metal member precoated with a glass coating completely surrounding said member, sandwiching said glass-coated metal member between said two glass members, and inductively heating said metal member until its glass coating melts to form a glass-to-glass seal between said two glass members with said metal member being completely enclosed in said seal, the glass members having continuous surfaces of glass therebetween.

2. The method of claim 1 wherein said glass members respectively are tubular and have annular end surfaces, and wherein said glass-coated metal member is annular and sandwiched between said annular surfaces.

3. The method of claim 2 wherein said providing step comprises the steps of forming a round metal rod into substantially a circle, integrally joining the ends of said rod, and applying said glass coating thereto.

4. The method of claim 2 wherein said providing step comprises the steps, in any order, of forming holes in the opposite ends of a metal rod, forming said rod into substantially a circle with said ends spaced apart to form a gap, inserting a metal pin in said holes which bridges said gap, said pin having a glass ring thereon abutting said ends, and applying said glass coating thereto.

5. The method of claim 2 wherein said metal has a coefficient of expansion substantially equal to the coefficient of expansion of the glass of said members and coating.

References Cited

UNITED STATES PATENTS 2,920,785  1/1960  Veres _____ 65—40 XR

OTHER REFERENCES

Partridge, Glass-to-Metal Seals, 1949, pp. 200, 201, published by the Society of Glass Technology.

S. LEON BASHORE, Primary Examiner

S. R. FRIEDMAN, Assistant Examiner

U.S. Cl. X.R.

65—43, 59